(12) United States Patent
Yamashita

(10) Patent No.: US 9,590,925 B2
(45) Date of Patent: Mar. 7, 2017

(54) PACKET PROCESSING APPARATUS, PACKET PROCESSING METHOD, AND NON-TRANSITORY COMPUTER-READABLE STORAGE MEDIUM

(71) Applicant: FUJITSU LIMITED, Kawasaki-shi, Kanagawa (JP)

(72) Inventor: Shinji Yamashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 119 days.

(21) Appl. No.: 14/460,541

(22) Filed: Aug. 15, 2014

(65) Prior Publication Data

US 2015/0109913 A1   Apr. 23, 2015

(30) Foreign Application Priority Data

Oct. 18, 2013   (JP) .................................. 2013-217772

(51) Int. Cl.
  *H04L 12/721*   (2013.01)
  *H04L 12/861*   (2013.01)
(52) U.S. Cl.
  CPC ................................ *H04L 49/9084* (2013.01)
(58) Field of Classification Search
  CPC ............................. H04L 49/9084; H04L 47/10
  See application file for complete search history.

(56) References Cited

U.S. PATENT DOCUMENTS

| | | | | |
|---|---|---|---|---|
| 2012/0213078 A1* | 8/2012 | Kitada | .................... | H04L 47/17 370/236 |
| 2013/0229925 A1* | 9/2013 | Kitada | ................ | H04L 43/0847 370/246 |
| 2013/0230054 A1* | 9/2013 | Gilat | .................... | H04L 49/9084 370/401 |
| 2013/0250799 A1* | 9/2013 | Ishii | ...................... | H04L 45/745 370/252 |
| 2013/0336329 A1* | 12/2013 | Gopinath | ................ | H04L 45/24 370/401 |
| 2014/0016461 A1* | 1/2014 | Ishikawa | ................. | H04L 47/17 370/230 |

FOREIGN PATENT DOCUMENTS

| | | |
|---|---|---|
| JP | 2010-161473 | 7/2010 |
| JP | 2011-101245 | 5/2011 |
| JP | 2011-159247 | 8/2011 |

OTHER PUBLICATIONS

"OpenFlow Switch Specification Version 1.0.0 (Wire Protocol 0×01)", pp. 1-42, Dec. 31, 2009.

* cited by examiner

*Primary Examiner* — Fan Ng
(74) *Attorney, Agent, or Firm* — Staas & Halsey LLP

(57) ABSTRACT

A packet processing apparatus receiving a packet includes a memory storing a flow information, and a processor coupled to the memory and configured to, when a processing method for the received packet is defined in the flow information, store the packet into a buffer in the packet processing apparatus and process the packet stored in the buffer using the processing method, when the processing method is not defined in the flow information and a utilization rate of the buffer exceeds a threshold value, transmit the packet to another packet processing apparatus, and when the processing method is not defined in the flow information and the utilization rate of the buffer does not exceed the threshold value, store the packet into the buffer and issue an inquiry about the processing method.

17 Claims, 18 Drawing Sheets

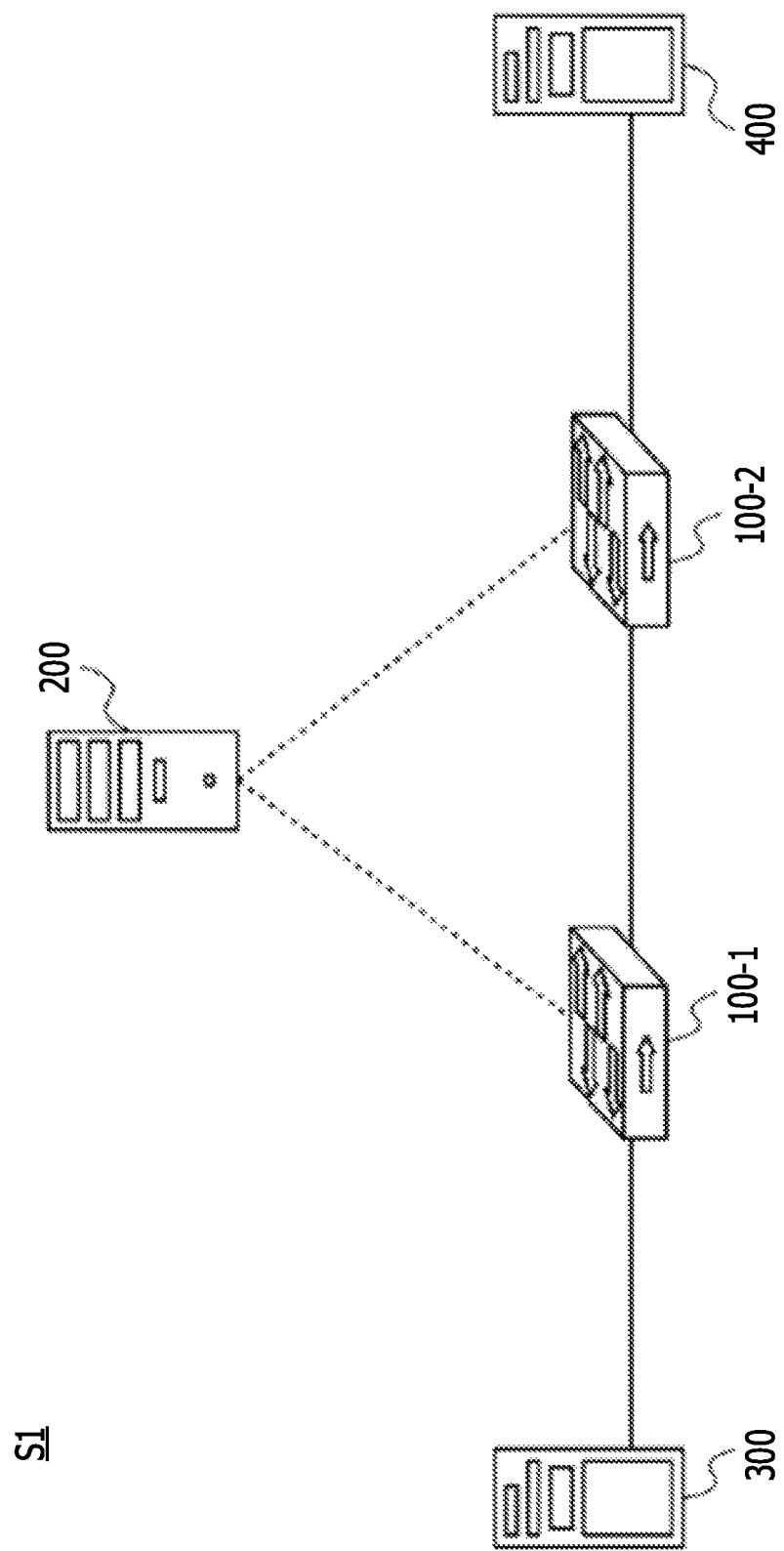

FIG. 3A

| FLOW ID | RULE | ACTION | STATISTICAL INFORMATION |
|---|---|---|---|
| 1 | RULE#1 | ALL | 1000byte |
| 2 | RULE#2 | TABLE | 500byte |
| 3 | RULE#3 | TABLE | 800byte |
| 4 | RULE#4 | TABLE | 100byte |

} FLOW ENTRY

FIG. 3B

| SWITCH PORT | MAC TRANSMISSION SOURCE ADDRESS | ⁓ | TCP TRANSMISSION SOURCE PORT NUMBER | TCP DESTINATION PORT NUMBER |

FIG. 3C

1. ALL         : FORWARDING TO ANOTHER PORT
2. CONTROLLER  : FORWARDING TO CONTROLLER
3. LOCAL       : FORWARDING TO SPECIFIC ONE PORT
4. TABLE       : EXECUTION OF ACTION IN FLOW TABLE
5. IN_PORT     : TRANSMISSION TO RECEPTION PORT

PACKET PROCESSING APPARATUS, PACKET PROCESSING METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2013-217772, filed on Oct. 18, 2013, the entire contents of which are incorporated herein by reference.

FIELD

The embodiments discussed herein are related to a packet processing apparatus, a packet processing method, and a non-transitory computer-readable storage medium.

BACKGROUND

A communication system that adopts OpenFlow has been known. A communication system using OpenFlow includes an OpenFlow switch and an OpenFlow controller as packet processing apparatuses.

An OpenFlow switch includes a flow table. A flow table defines a processing method for an input packet. When a packet is input to an OpenFlow switch, the packet is processed according to the definition in the flow table. Processing of the packet includes forwarding or discarding, for example.

In contrast, if a packet not defined in the flow table is input to the OpenFlow switch, the OpenFlow switch inquires the processing method for the packet from the OpenFlow controller. Upon receiving the processing method transmitted from the OpenFlow controller, the OpenFlow switch processes the packet based on the received processing method. A related-art technical document is "OpenFlow Switch Specification Version 1.0.0 (Wire Protocol 0x01)", Dec. 31, 2009

SUMMARY

According to an aspect of the invention, a packet processing apparatus receiving a packet includes a memory storing a flow information, and a processor coupled to the memory and configured to, when a processing method for the received packet is defined in the flow information, store the packet into a buffer in the packet processing apparatus and process the packet stored in the buffer using the processing method, when the processing method is not defined in the flow information and a utilization rate of the buffer exceeds a threshold value, transmit the packet to another packet processing apparatus, and when the processing method is not defined in the flow information and the utilization rate of the buffer does not exceed the threshold value, store the packet into the buffer and issue an inquiry about the processing method.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 schematically depicts the structure of a communication system in a first embodiment;

FIG. 3A depicts an example of a flow table;

FIG. 3B depicts an example of a rule;

FIG. 3C depicts an example of definition of actions;

DESCRIPTION OF EMBODIMENTS

Figure 2A:
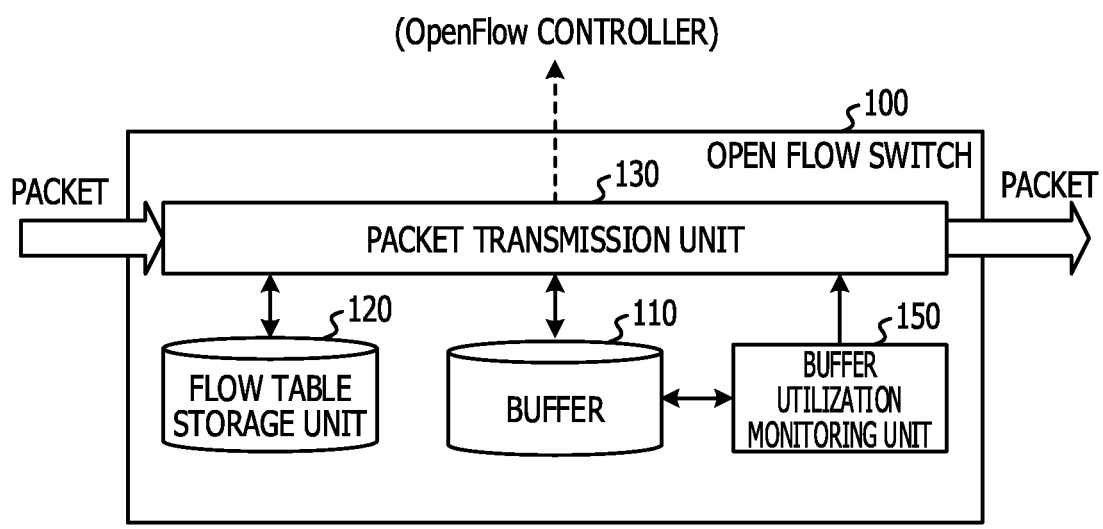
FIG. 2A depicts an example of a block diagram of an OpenFlow switch.

While an OpenFlow switch inquires a processing method for a packet from an OpenFlow controller, the packet input to the OpenFlow switch is stored in the buffer included in the OpenFlow switch. The buffer has a certain storage capacity. If another packet not defined in the flow table is further input to the OpenFlow switch while the buffer stores the packet, the storage capacity of the buffer may be exceeded. This causes a buffer overflow in which the buffer overflows with packets. If a buffer overflow occurs, the other packet that has been input is discarded. After the other packet is discarded, the transmission source of the other packet is notified of the fact and another packet is transmitted again. However, this causes problems such as an increase in transmission time or reduction in transmission efficiency.

An object of this example is to provide a packet processing apparatus, a packet processing method, and a packet processing program that avoid a buffer overflow caused by input packets.

First Embodiment

FIG. 1 schematically depicts the structure of a communication system S1 in a first embodiment.

The communication system S1 includes OpenFlow switches 100-1 and 100-2 and an OpenFlow controller 200, as depicted in FIG. 1.

The OpenFlow switch 100-1 and the OpenFlow switch 100-2 are connected to each other through a communication line. The OpenFlow switches 100-1 and 100-2 are connected to the OpenFlow controller 200 through control lines, respectively. The OpenFlow switch 100-1 is also connected to a transmission host 300 through a communication line. The OpenFlow switch 100-2 is also connected to a reception host 400 through a communication line. The communication lines and the control lines are cables such as, for example, optical fiber cables or metal cables. Wireless connection may be used instead of such wired connection.

The OpenFlow switches 100-1 and 100-2 process input packets. Processing of packets includes modifying or rewriting of a packet header as well as forwarding and discarding described above. For example, when a packet transmitted from the transmission host 300 is input to the OpenFlow switch 100-1, the OpenFlow switch 100-1 forwards the input packet to the OpenFlow switch 100-2. When the packet forwarded from the OpenFlow switch 100-1 is input to the OpenFlow switch 100-2, the OpenFlow switch 100-2 forwards the input packet to the reception host 400. Consequently, the packet transmitted from the transmission host 300 reaches the reception host 400. The OpenFlow switches 100-1 and 100-2 will be described in detail later.

The OpenFlow controller 200 controls the operation of the OpenFlow switches 100-1 and 100-2. For example, upon receiving an inquiry about a processing method for a packet from the OpenFlow switch 100-1, the OpenFlow controller 200 transmits the processing method for the packet to the OpenFlow switches 100-1 and 100-2. The OpenFlow switch 100-1 processes the packet according to the received processing method for the packet. If the OpenFlow switch 100-1 forwards the received packet to the OpenFlow switch 100-2, the OpenFlow switch 100-2 processes the packet according to the received processing method for the packet.

The above inquiry is performed based on a PacketIn message, for example. A PacketIn message notifies the OpenFlow controller 200 that the OpenFlow switch 100-1 has received an undefined packet. The transmission of the processing method for the packet, which is described above, is performed based on a FlowMod message, for example. A FlowMod message registers or adds a new flow entry in the OpenFlow switches 100-1 and 100-2 or changes or deletes an existing flow entry. Details on the OpenFlow controller 200 and a flow entry will be described later. Various messages including a PacketIn message and a FlowMod message are defined by the OpenFlow protocol.

The transmission host 300 is a host device that transmits packets. The reception host 400 is a host device that receives packets. An example of a host device is a server device. The transmission host 300 performs various types of processing in addition to transmission of packets. The reception host 400 performs various types of processing in addition to reception of packets.

Next, the above OpenFlow switches 100-1 and 100-2 and OpenFlow controller 200 will be described in detail with reference to FIGS. 2A, 2B, 3A, 3B, and 3C.

Figure 2B:
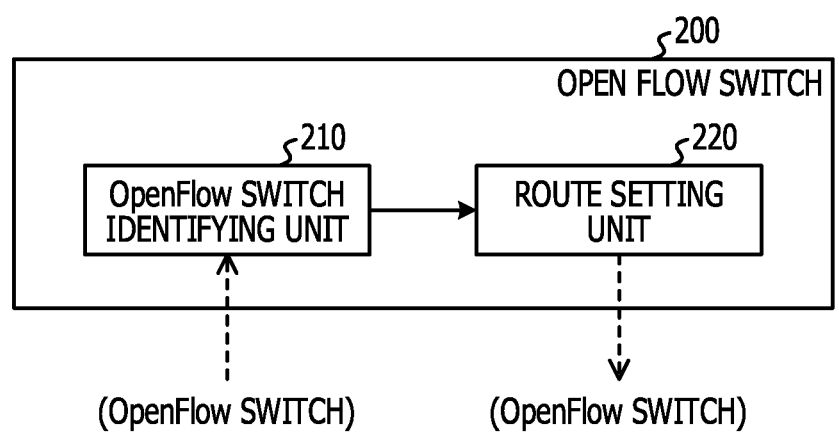
FIG. 2B depicts an example of a block diagram of an OpenFlow controller.

FIG. 2A depicts an example of a block diagram of the OpenFlow switches 100-1 and 100-2. FIG. 2B depicts an example of a block diagram of the OpenFlow controller 200. FIG. 3A depicts an example of a flow table. FIG. 3B depicts an example of a rule. FIG. 3C depicts an example of definition of actions.

First, the OpenFlow switches 100-1 and 100-2 will be described with reference to FIGS. 2A, 3A, 3B, and 3C. Since the OpenFlow switch 100-1 and the OpenFlow switch 100-2 have basically the same structure, the OpenFlow switch 100-1 will be typically described as the OpenFlow switch 100.

As depicted in FIG. 2A, the OpenFlow switch 100 includes a buffer 110, a flow table storage unit 120, a packet transmission unit 130, and a buffer utilization rate monitoring unit 150.

The buffer 110 stores a packet that has been input to the OpenFlow switch 100. More specifically, the buffer 110 stores the packet until it is processed by the packet transmission unit 130. That is, the buffer 110 stores the packet temporarily. The buffer 110 has a certain storage capacity. Accordingly, if the buffer 110 tries to store packets exceeding its storage capacity, the buffer 110 is not able to store all of the packets and a buffer overflow occurs. A buffer overflow is also referred to as a packet loss, for example.

The flow table storage unit 120 stores a flow table. A flow table includes at least one flow entry. A flow entry includes a flow identification (flow ID), rule, action, and statistical information. A flow ID is identification information for identifying a flow entry. A rule represents conditions for matching with a packet header. Specifically, as depicted in FIG. 3B, a rule has various properties such as a switch port, an MAC transmission source address, . . . , a TCP transmission source address, and a TCP destination port number. A collection of packets having the same properties is referred to as a flow, for example. The properties of the packet header of a packet input to the OpenFlow switch 100 are compared with those of a rule and, if the properties match, an action described later is executed. A match may be a partial match or complete match. The packet processing executed when the packet header matches a rule is defined as an action. As depicted in FIG. 3C, there are some types of actions. For example, action "ALL" defines forwarding to a port other than the port that received the packet and action "CONTROLLER" defies forwarding to the OpenFlow controller 200. If no actions are registered, the input packet is discarded. Statistical information represents the matching status for each flow entry in a flow table. The matching status includes, for example, the number of bytes of matched packets. The matching status may include the number of matched packets as well as the number of bytes of matched packets.

The packet transmission unit 130 transmits the packet that has been input to the OpenFlow switch 100 based on the flow table. More specifically, when a packet is input, the packet transmission unit 130 determines whether the packet header of the input packet matches any rule with reference to the flow table storage unit 120. When determining that the packet header of the input packet matches any rule, the packet transmission unit 130 executes the action of the flow entry including the rule. That is, the packet transmission unit 130 performs packet processing according to a defined processing method. As a result, the input packet is forwarded or discarded. In contrast, when determining that the packet header of the input packet does not match any rule, the packet transmission unit 130 stores the input packet in the buffer 110. Then, the packet transmission unit 130 transmits, to a predetermined port, a PacketIn message that inquires the processing method for an undefined packet. As a result, the PacketIn message is transmitted to the OpenFlow controller 200.

The buffer utilization rate monitoring unit 150 monitors the utilization rate of the buffer 110. The utilization rate (occupancy rate) is defined as, for example, the rate (percentage: %) of the number of bytes of packets stored in the buffer 110 to the storage capacity (bytes) of the buffer 110.

The buffer utilization rate monitoring unit 150 determines whether the utilization rate of the buffer 110 is close to the value beyond which a buffer overflow occurs. Specifically, a certain threshold (%) for determining whether the utilization rate is close to the value beyond which a buffer overflow occurs is first determined. If the utilization rate exceeds the certain threshold, the buffer utilization rate monitoring unit 150 determines that the utilization rate of the buffer 110 is close to the value beyond which a buffer overflow occurs. If the utilization rate becomes equal to or less than the certain threshold from the state in which the utilization rate exceeds the certain threshold, the buffer utilization rate monitoring unit 150 determines that the utilization rate of the buffer 110 is sufficiently lower than the value beyond which a buffer overflow occurs. Upon determining that the utilization rate of the buffer 110 is close to the value beyond which a buffer overflow occurs, the buffer utilization rate monitoring unit 150 notifies the packet transmission unit 130 of the fact. Upon determining that the utilization rate of the buffer 110 is sufficiently lower than the value beyond which a buffer overflow occurs, the buffer utilization rate monitoring unit 150 notifies the packet transmission unit 130 of the fact. The buffer utilization rate monitoring unit 150 may be included in the OpenFlow controller 200 or a server device disposed separately from the OpenFlow switch 100 without being included in the OpenFlow switch 100. In this case, the utilization rate of the buffer 110 is monitored from the OpenFlow controller 200 or the separate server device.

Next, the OpenFlow controller 200 will be described with reference to FIG. 2B.

As depicted in FIG. 2B, the OpenFlow controller 200 includes an OpenFlow switch identifying unit 210 and a route setting unit 220.

The OpenFlow switch identifying unit 210 receives a PacketIn message transmitted from the OpenFlow switch 100. The OpenFlow switch identifying unit 210 transmits the packet header included in the received PacketIn message to the route setting unit 220. If there is identification information for identifying the OpenFlow switch 100 in the received PacketIn message, the OpenFlow switch identifying unit 210 identifies the OpenFlow switch 100 through which the packet has passed based on the identification information.

The route setting unit 220 sets the route through which a packet passes. This setting is made for the OpenFlow switch 100. When the OpenFlow controller 200 controls the operation of a plurality of OpenFlow switches 100, all of the OpenFlow switches 100 are set. This identifies the route through which the packet passes. Upon receiving the packet header from the OpenFlow switch identifying unit 210, the route setting unit 220 generates a processing method for the packet including the received packet header based on the packet header. For example, a forwarding route is generated so that the communication loads of the OpenFlow switches 100 included in the communication system S1 are distributed. The route setting unit 220 transmits a FlowMod message including the generated processing method to the OpenFlow switch 100. The FlowMod message is received by the packet transmission unit 130 of the OpenFlow switch 100. The packet transmission unit 130 registers, in the flow table storage unit 120, the processing method included in the FlowMod message. That is, the flow entry that defines the processing method for the packet is added to the flow table. The packet transmission unit 130 processes a packet stored in the buffer 110 based on the added flow entry with reference to the flow table storage unit 120.

Subsequently, the hardware structure of the OpenFlow switch 100 will be described with reference to FIG. 4.

Figure 4:
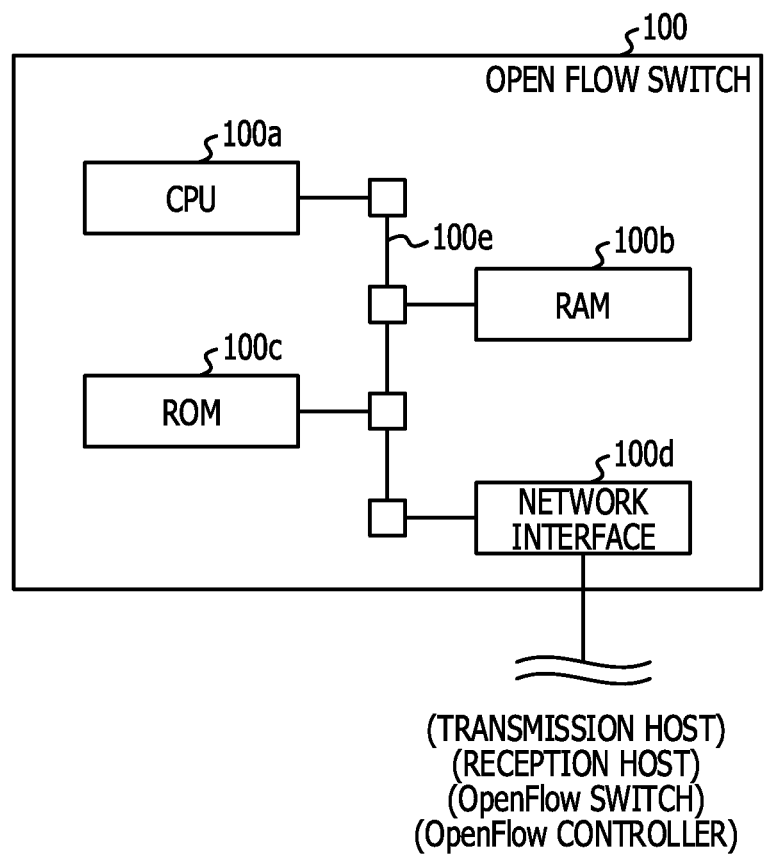
FIG. 4 depicts an example of the hardware structure of the OpenFlow switch.

FIG. 4 depicts an example of the hardware structure of the OpenFlow switch 100.

The OpenFlow switch 100 includes a central processing unit (CPU) 100a, a random access memory (RAM) 100b, a read only memory (ROM) 100c, and a network interface (network I/F) 100d. These devices 100a to 100d are interconnected by a bus 100e. At least the CPU 100a and the RAM 100b cooperate with each other to achieve a computer. A computer may include an application specific integrated circuit (ASIC) or a field programmable gate array (FPGA). A network processing unit (NPU) including the CPU 100a and a hardware circuit specific to packet processing may be used instead of the CPU 100a.

The RAM 100b achieves the buffer 110 and the flow table storage unit 120. The RAM 100b may achieve the buffer 110 and a RAM different from the RAM 100b may achieve the flow table storage unit 120. The network interface 100d includes a port and a physical layer chip (PHY Chip), for example. Another OpenFlow switch 100, OpenFlow controller 200, transmission host 300, or reception host 400 is connected to the network interface 100d.

The above RAM 100b reads a program stored in the ROM 100c. The CPU 100a executes the read program, so that the above packet transmission unit 130 and buffer utilization rate monitoring unit 150 are achieved. In addition, the CPU 100a executes the read program, so that the packet processing method by the OpenFlow switch 100, which will be described later, is executed. Note that the program may follow the flowchart described later. The packet transmission unit 130 may be achieved by an ASIC or FPGA instead of the CPU 100a.

Subsequently, the hardware structure of the OpenFlow controller 200 will be described with reference to FIG. 5. The transmission host 300 and the reception host 400 have a structure basically similar to that of the OpenFlow controller 200.

Figure 5:
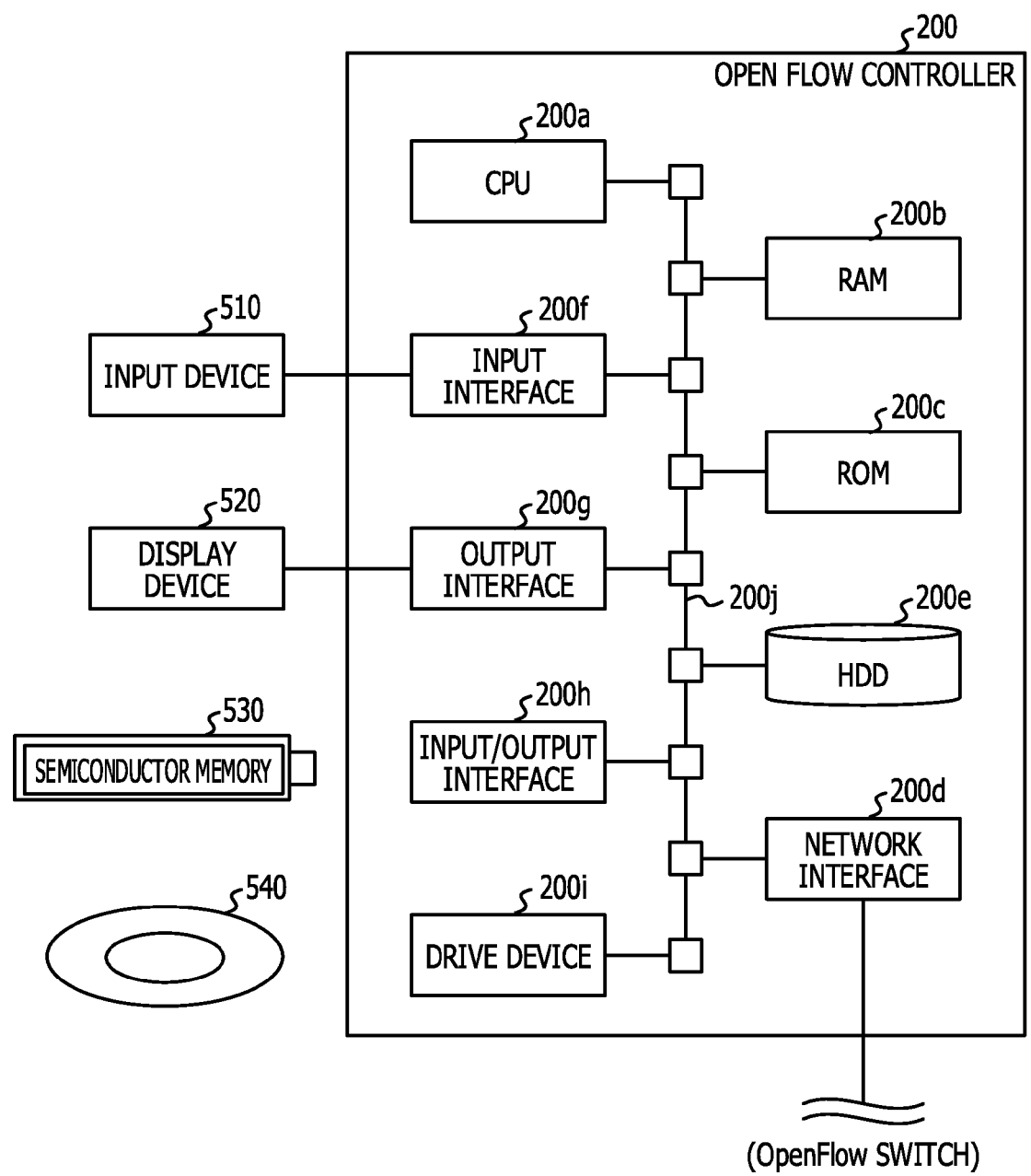
FIG. 5 depicts an example of the hardware structure of the OpenFlow controller.

FIG. 5 depicts an example of the hardware structure of the OpenFlow controller 200. The components of the OpenFlow controller 200 that are similar to those of the OpenFlow switch 100 depicted in FIG. 4 are given the same reference symbols and descriptions are omitted.

The OpenFlow controller 200 includes at least a CPU 200a, RAM 200b, a ROM 200c, and a network interface 200d. The OpenFlow controller 200 may include, as occasion calls, at least one of a hard disc drive (HDD) 200e, an input interface 200f, an output interface 200g, an input/output interface 200h, and a drive device 200i. These devices 200a to 200i are interconnected by a bus 200j.

An input device 510 is connected to the input interface 200f. The input device is a keyboard or mouse, for example.

A display device 520 is connected to the output interface 200g. The display device is a liquid crystal display with or without a touch panel, for example.

A semiconductor memory 530 is connected to the input/output interface 200h. The semiconductor memory 530 is a universal serial bus (USB) memory or a flash memory, for example. The an input/output interface 200h reads a program or data stored in the semiconductor memory 530.

The input interface 200f and the input/output interface 200h have USB ports, for example. The output interface 200g has a display port, for example.

A portable recording medium 540 is inserted into the drive device 200i. The portable recording medium 540 is a removal disc such as a compact disc (CD)-ROM or digital versatile disc (DVD). A program or data stored in the portable recording medium 540 is read by the drive device 200i.

The above RAM 200b reads a program stored in at least one of the ROM 200c, the HDD 200e, and the semiconductor memory 530. The RAM 200b reads a program stored in the portable recording medium 540. The OpenFlow switch identifying unit 210 and the route setting unit 220 described above are achieved by causing the CPU 200a to execute the read program. Note that the program may follow the flowchart described later.

Subsequently, the operation of the communication system S1 will be described with reference to FIGS. 6 to 13.

Figure 6:
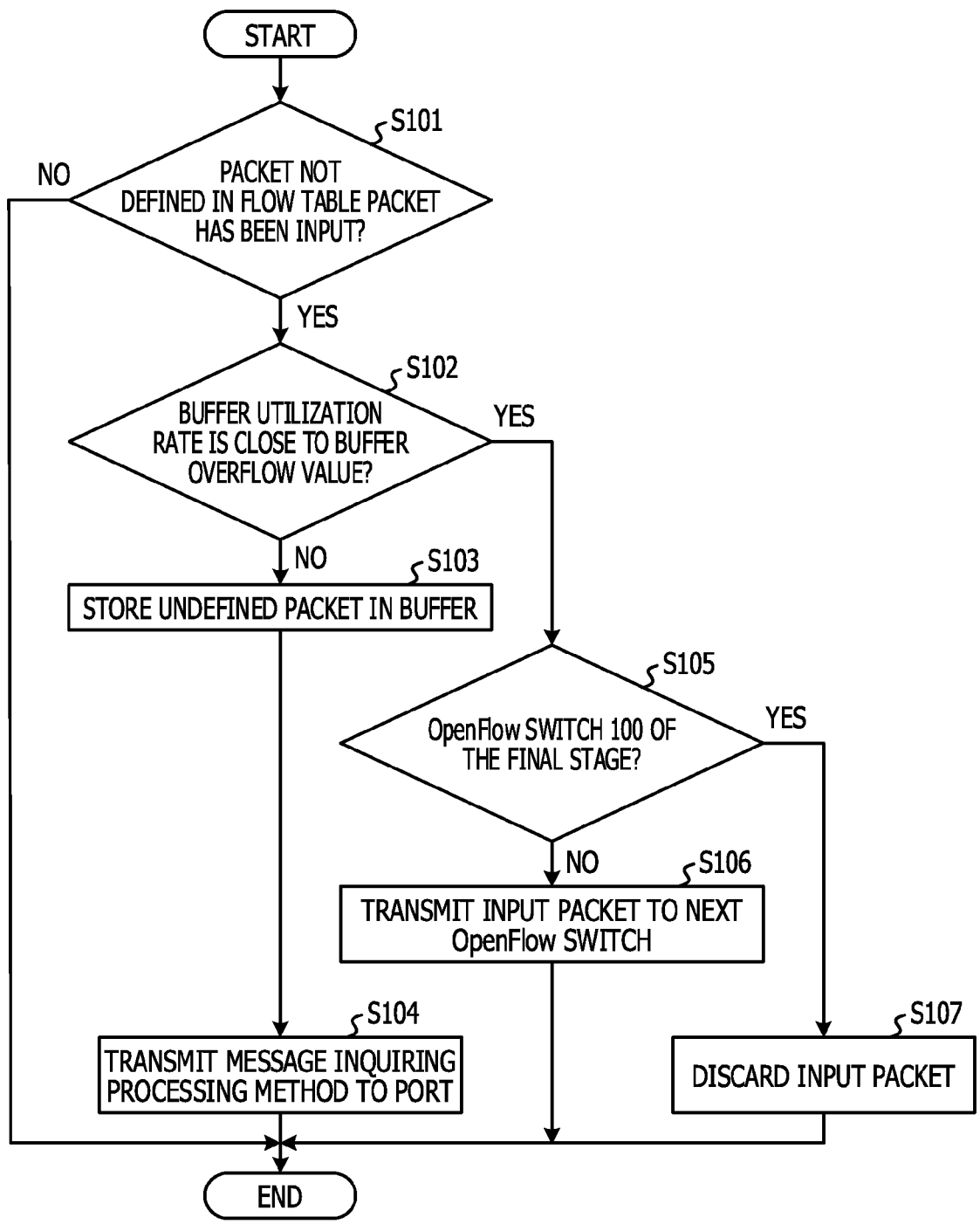
FIG. 6 is a flowchart depicting an example of the operation of the OpenFlow switch.
Figure 7:
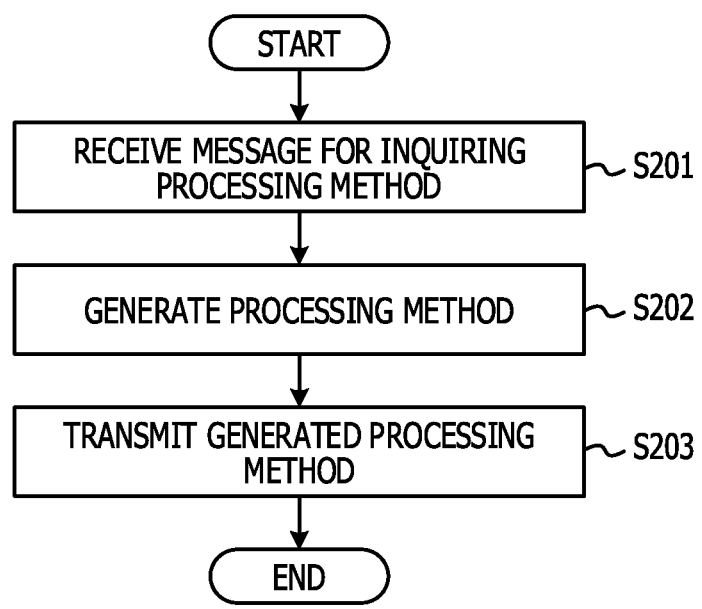
FIG. 7 is a flowchart depicting an example of the operation of the OpenFlow controller.

FIG. 6 is a flowchart depicting an example of the operation of the OpenFlow switch 100. FIG. 7 is a flowchart depicting an example of the operation of the OpenFlow controller 200. FIGS. 8 to 13 depict examples of the operation of the communication system S1 in the first embodiment.

As depicted in FIG. 6, the packet transmission unit 130 determines whether a packet not defined in the flow table has been input (step S101). For example, upon receiving a packet, the packet transmission unit 130 checks the flow table storage unit 120. The packet transmission unit 130 compares the packet header of the received packet with the rules in the flow table and, if there is no matched rules as a result of the comparison, determines that a packet not defined in the flow table has been input (YES in step S101). If there is a matched rule, the packet transmission unit 130 determines that a packet defined in the flow table has been input (NO in step S101). In this case, the packet transmission unit 130 executes the action related to the rule.

If packet transmission unit 130 determines that a packet not defined in the flow table has been input, the buffer utilization rate monitoring unit 150 determines whether the buffer utilization rate is close to the value beyond which a buffer overflow occurs (step S102). For example, the buffer utilization rate monitoring unit 150 checks the buffer 110. As a result, if the utilization rate of the buffer 110 is equal to or less than a certain threshold, the buffer utilization rate monitoring unit 150 determines that the buffer utilization rate is sufficiently lower than the value beyond which a buffer overflow occurs (NO in step S102). In this case, the packet transmission unit 130 stores the input undefined packet in the buffer 110 (step S103). Then, the packet transmission unit 130 transmits a message that inquires a processing method to a port (step S104).

This causes the OpenFlow switch 100 to transmit, to the OpenFlow controller 200, the message that inquires the processing method for the packet. In the OpenFlow controller 200, as depicted in FIG. 7, the OpenFlow switch identifying unit 210 receives the message that inquires the processing method (step S201). Next, the route setting unit 220 generates the processing method (step S202) and transmits the generated processing method (step S203). This causes the OpenFlow controller 200 to transmit the processing method for the packet to the OpenFlow switch 100. The OpenFlow controller 200 transmits the processing method to all of the OpenFlow switches 100 included in the communication system S1. Upon receiving the processing method for the packet transmitted from the OpenFlow controller 200, the OpenFlow switch 100 processes the packet according to the received processing method.

Figure 8:
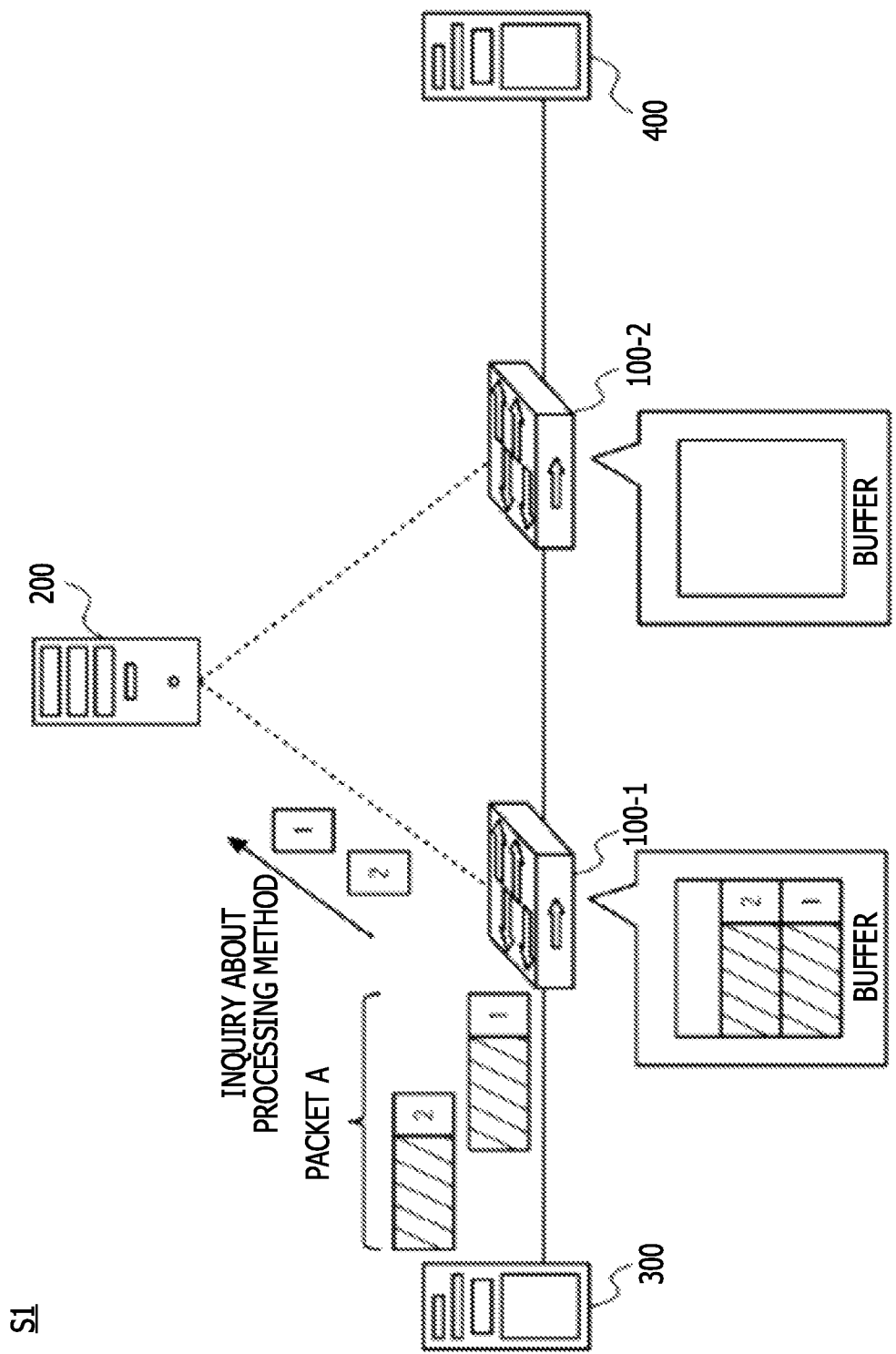
FIG. 8 depicts an example of the operation of the communication system in the first embodiment.
Figure 9:
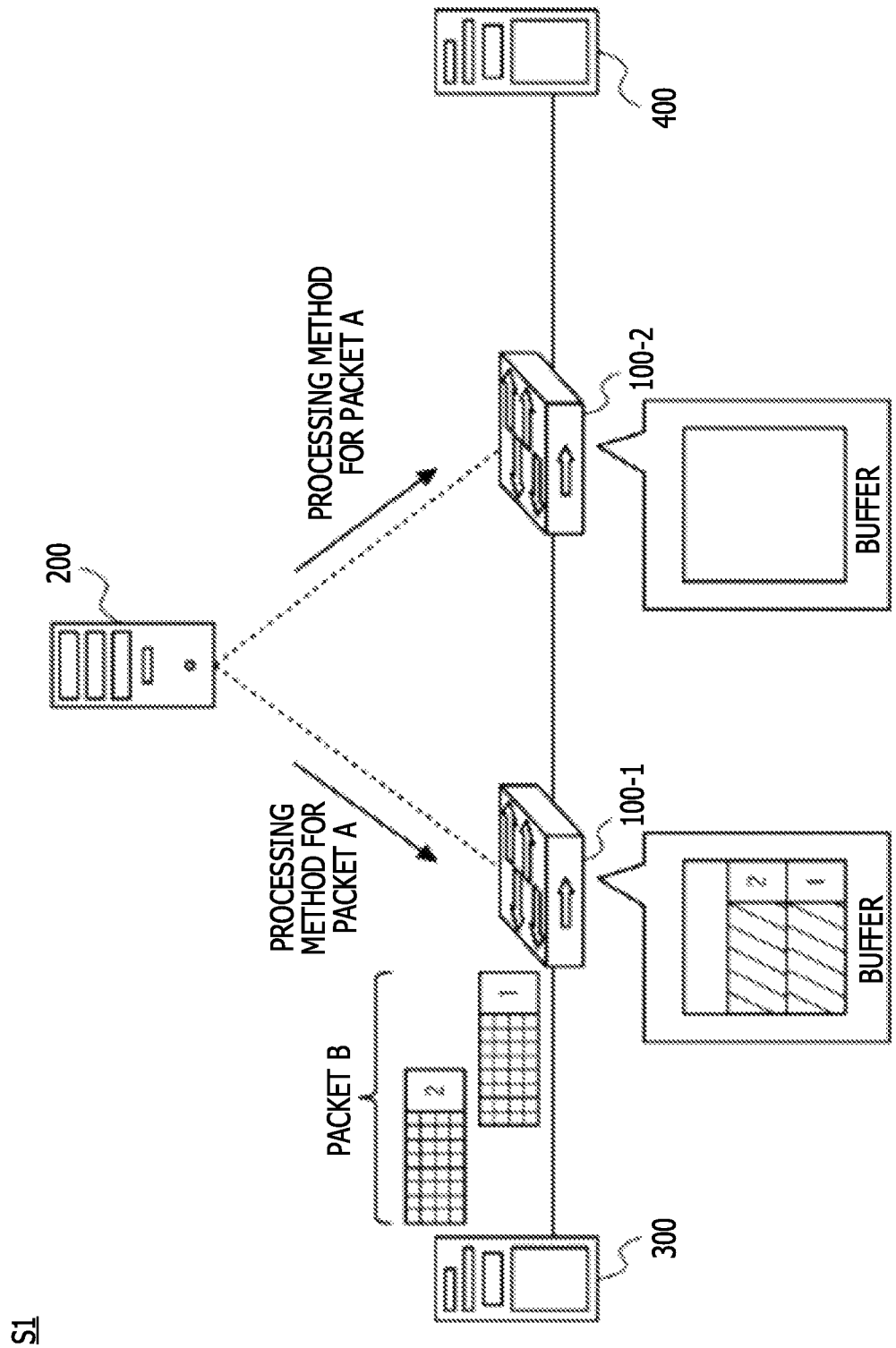
FIG. 9 depicts an example of the operation of the communication system in the first embodiment.

The above operation will be described with reference to FIGS. 8 and 9. As depicted in FIG. 8, if packet A not defined in the flow table is input to the OpenFlow switch 100-1 and if the buffer utilization rate is sufficiently lower than the value beyond which a buffer overflow occurs (for example, if no packet is stored), packet A that has been input to the OpenFlow switch 100-1 is stored in the buffer. Then, the OpenFlow switch 100-1 transmits a packet header including a sequence number (for example, "1" or "2") to the OpenFlow controller 200 and inquires the processing method for packet A. As a result, as depicted in FIG. 9, the OpenFlow controller 200 transmits the processing method for packet A to the OpenFlow switches 100-1 and 100-2.

In FIG. 6, if the utilization rate of the buffer 110 exceeds a certain threshold, the buffer utilization rate monitoring unit 150 determines that the utilization rate is close to the value beyond which a buffer overflow occurs (YES in step S102). If the buffer utilization rate monitoring unit 150 determines that the buffer utilization rate is close to the value beyond which a buffer overflow occurs, the packet transmission unit 130 determines whether the OpenFlow switch 100 to which the packet has been input is the OpenFlow switch 100 of the final stage (step S105). This determination is made based on whether the packet transmission unit 130 is connected to the reception host 400. If the packet transmission unit 130 does not know whether the packet transmission unit 130 is connected to the reception host 400, the packet transmission unit 130 may inquire it from the OpenFlow controller 200. If the packet transmission unit 130 determines that the packet transmission unit 130 is not the OpenFlow switch 100 of the final stage (NO in step S105), the packet transmission unit 130 transmits the input packet to the next OpenFlow switch 100 (step S106).

Figure 10:
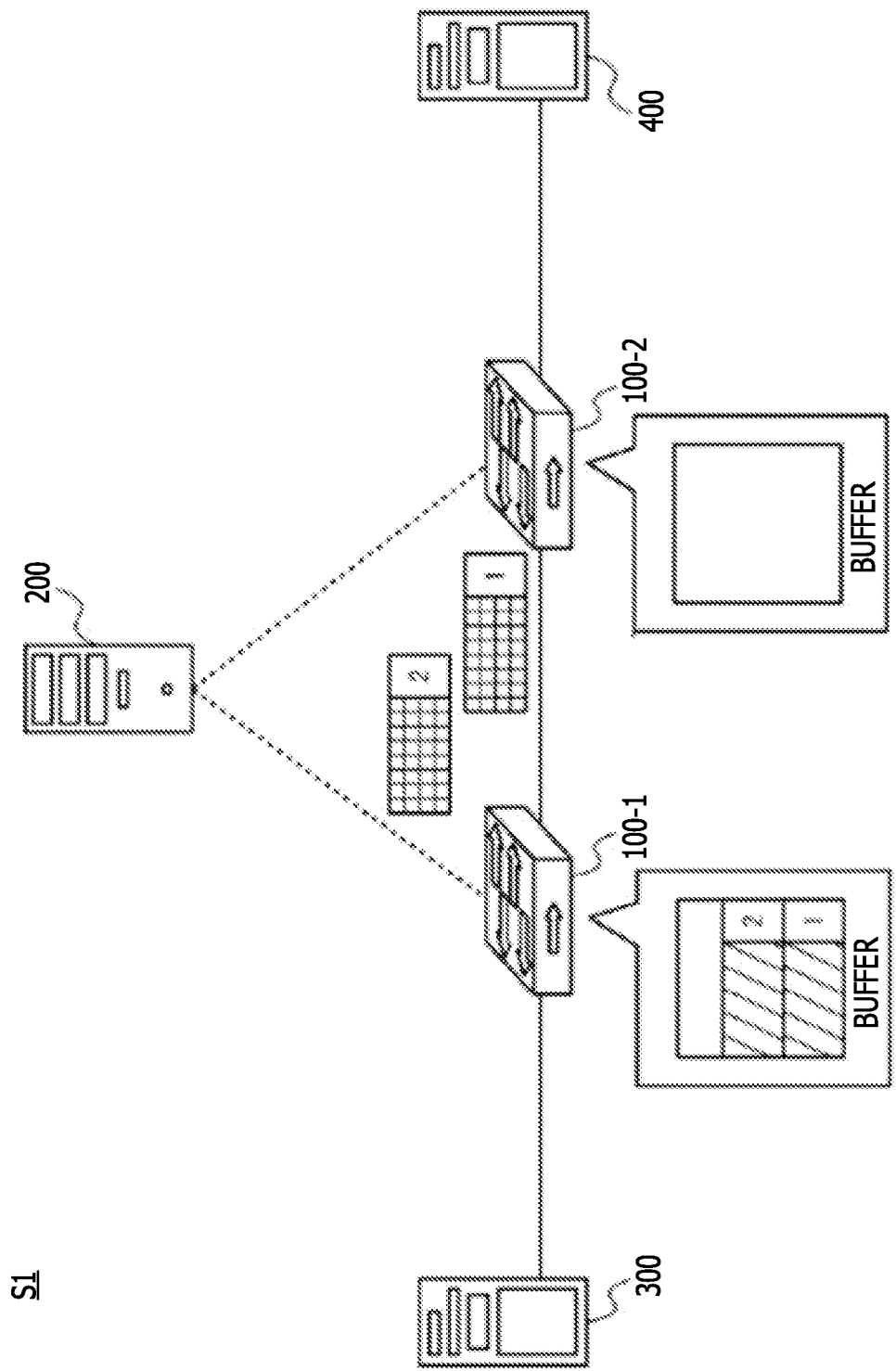
FIG. 10 depicts an example of the operation of the communication system in the first embodiment.

The above operation will be described with reference to FIGS. 9 to 13. As depicted in FIG. 9, packet A is stored in the buffer and the buffer utilization rate is close to the value beyond which a buffer overflow occurs. In this state, packet B not defined in the flow table is input to the OpenFlow switch 100-1. The property of packet B is different from that of packet A. In the OpenFlow switch 100-1, an inquiry about the processing method for packet B is not carried out to avoid a buffer overflow and the input packet B is forwarded to the OpenFlow switch 100-2, as depicted in FIG. 10. The OpenFlow switch 100-1 is processing packet A.

Figure 11:
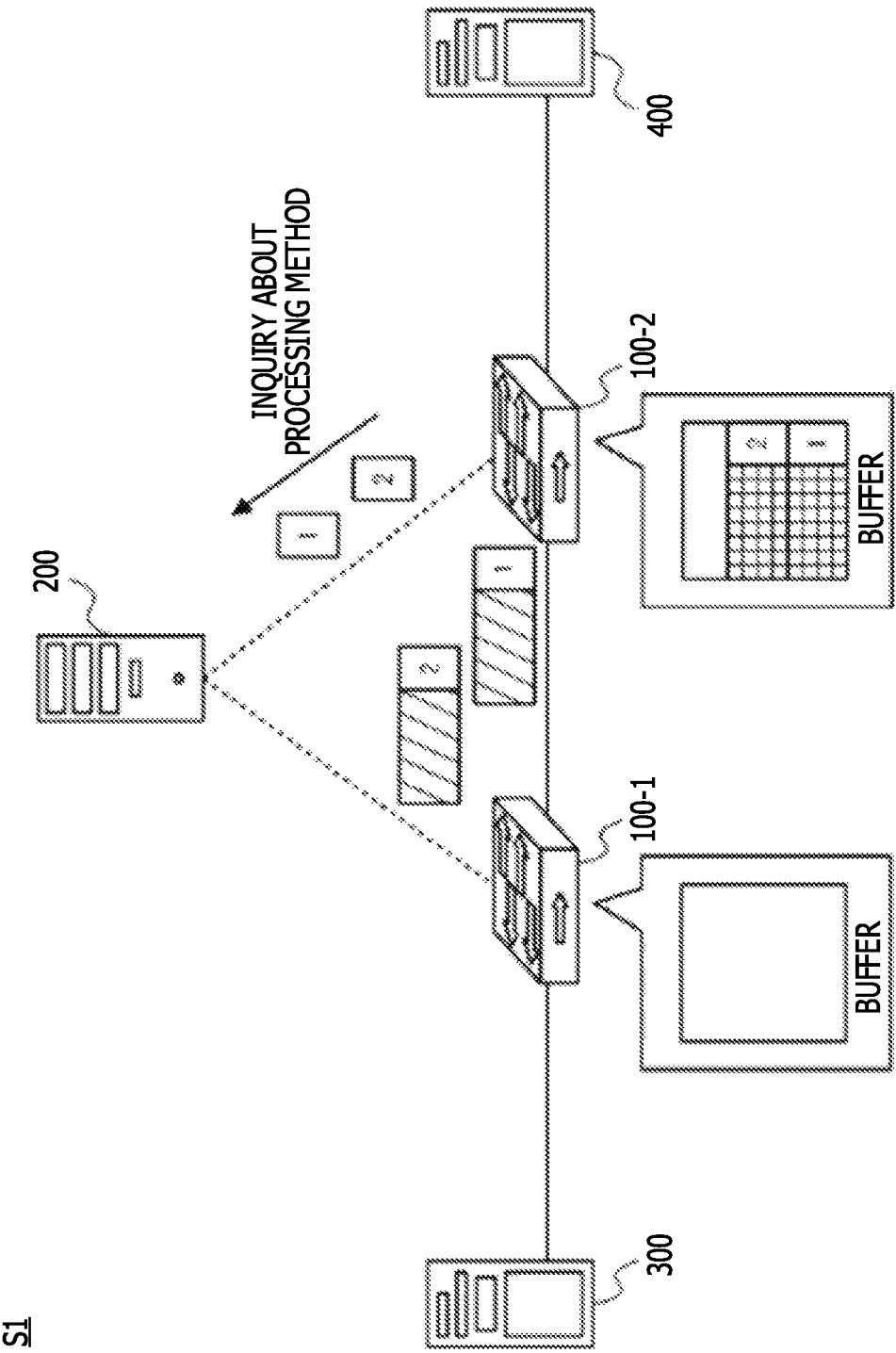
FIG. 11 depicts an example of the operation of the communication system in the first embodiment.

The operation that follows the flowchart in FIG. 6 is also performed in the OpenFlow switch 100-2. That is, as depicted in FIG. 11, if packet B not defined in the flow table is input to the OpenFlow switch 100-2 and if the buffer utilization rate is sufficiently lower than the value beyond which a buffer overflow occurs (for example, if no packet is stored), packet B that has been input to the OpenFlow switch 100-2 is stored in the buffer. Then, the OpenFlow switch 100-2 transmits the packet header including a sequence number to the OpenFlow controller 200 and inquires the processing method for packet B. On the other hand, in FIG. 11, the processing of packet A in the OpenFlow switch 100-1 is completed and packet A is been forwarded to the OpenFlow switch 100-2.

Figure 12:
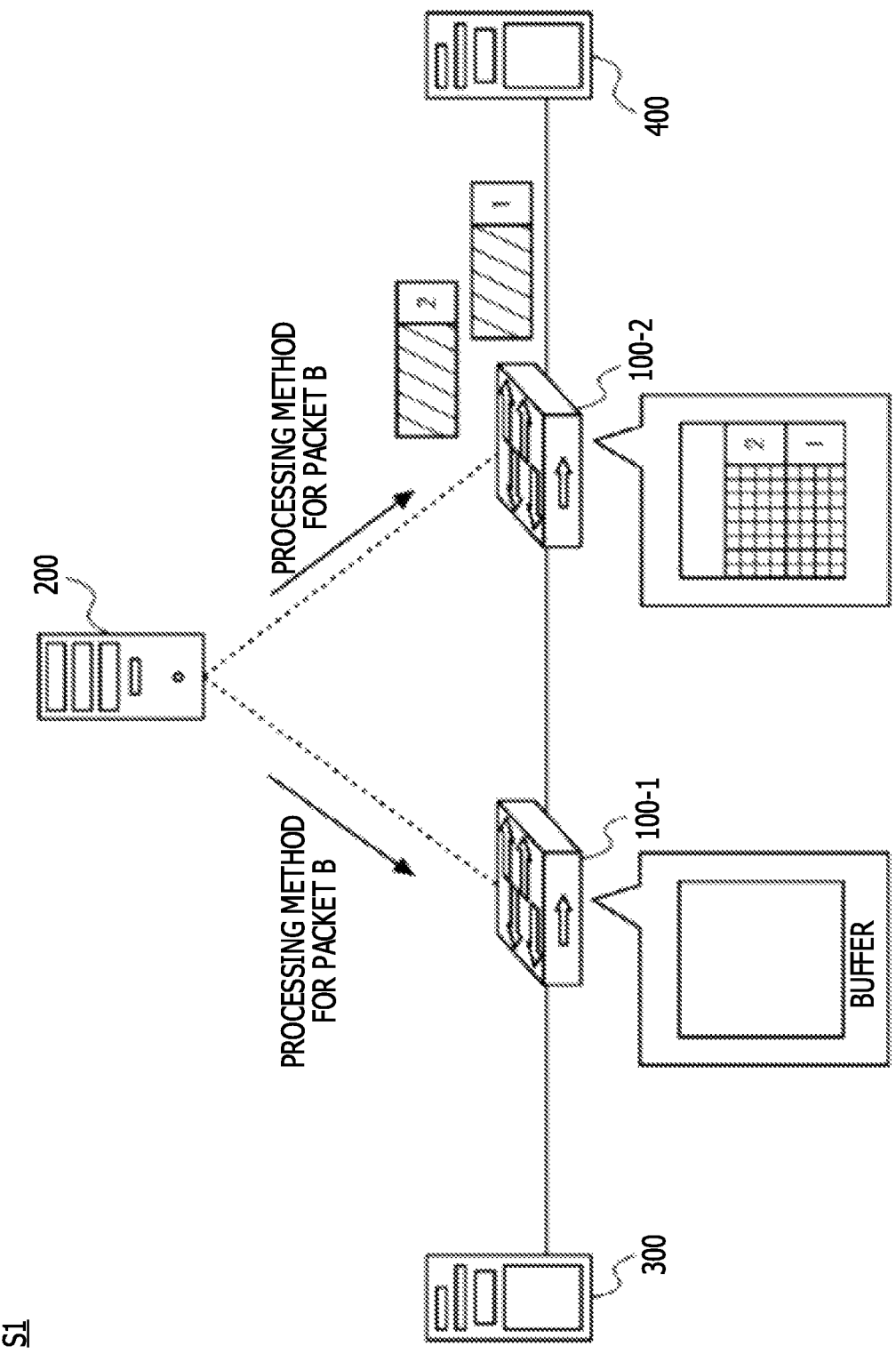
FIG. 12 depicts an example of the operation of the communication system in the first embodiment.

Upon receiving the processing method for packet B, the OpenFlow controller 200 transmits the processing method for packet B to the OpenFlow switches 100-1 and 100-2 as depicted in FIG. 12. On the other hand, since the OpenFlow switch 100-2 has already received the processing method for packet A in FIG. 12, the OpenFlow switch 100-2 forwards packet A based on the processing method. Upon receiving the processing method for packet B, the OpenFlow switch 100-2 processes packet B and, upon completion of the processing, forwards packet B as depicted in FIG. 13.

Figure 13:
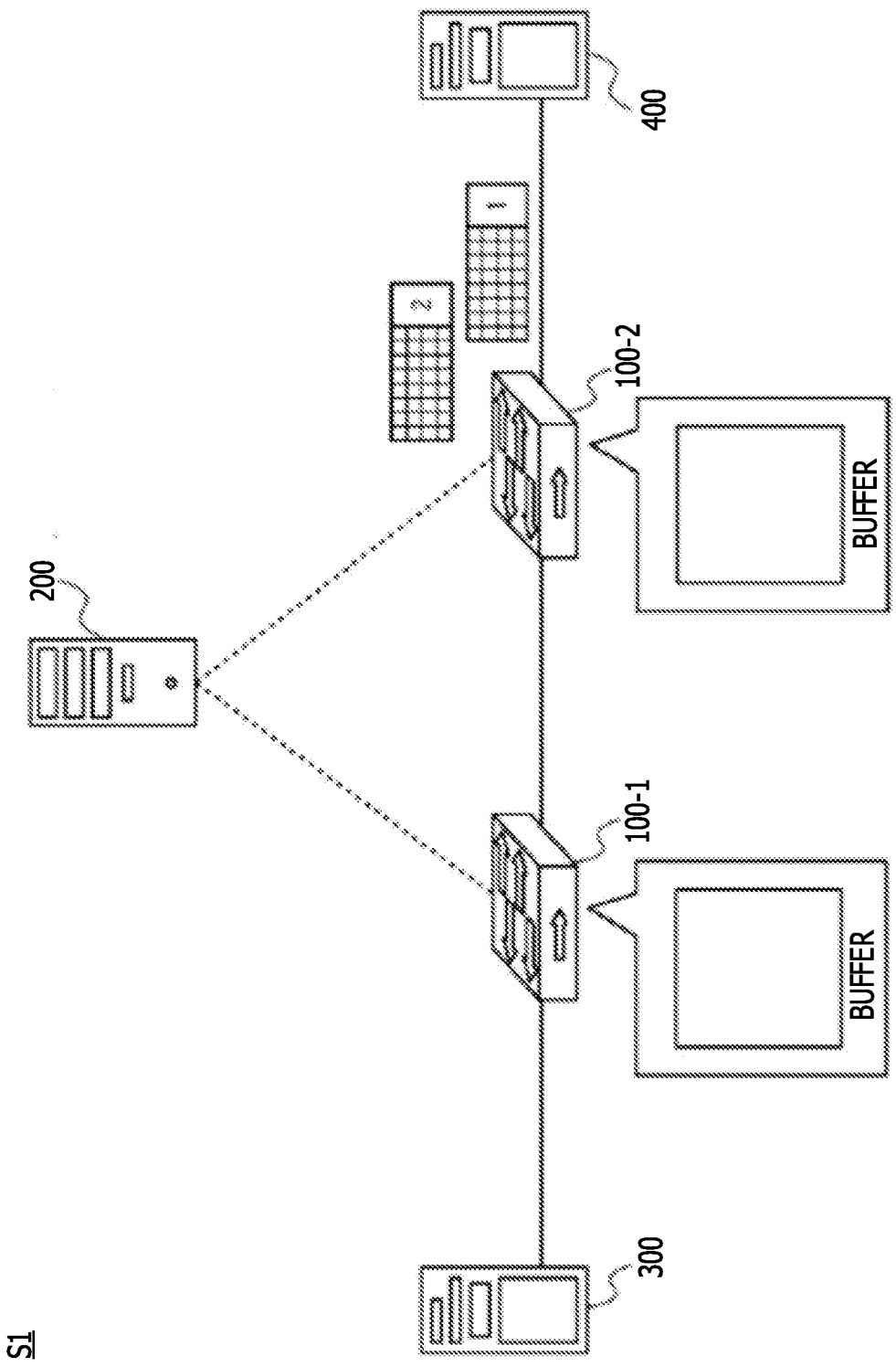
FIG. 13 depicts an example of the operation of the communication system in the first embodiment.

In FIG. 13, the OpenFlow switch 100-2 is connected to the reception host 400. Accordingly, if packet B is input when the buffer utilization rate of the OpenFlow switch 100-2 is close to the value beyond which a buffer overflow occurs, the packet transmission unit 130 discards the input packet (step S107).

Figure 14:
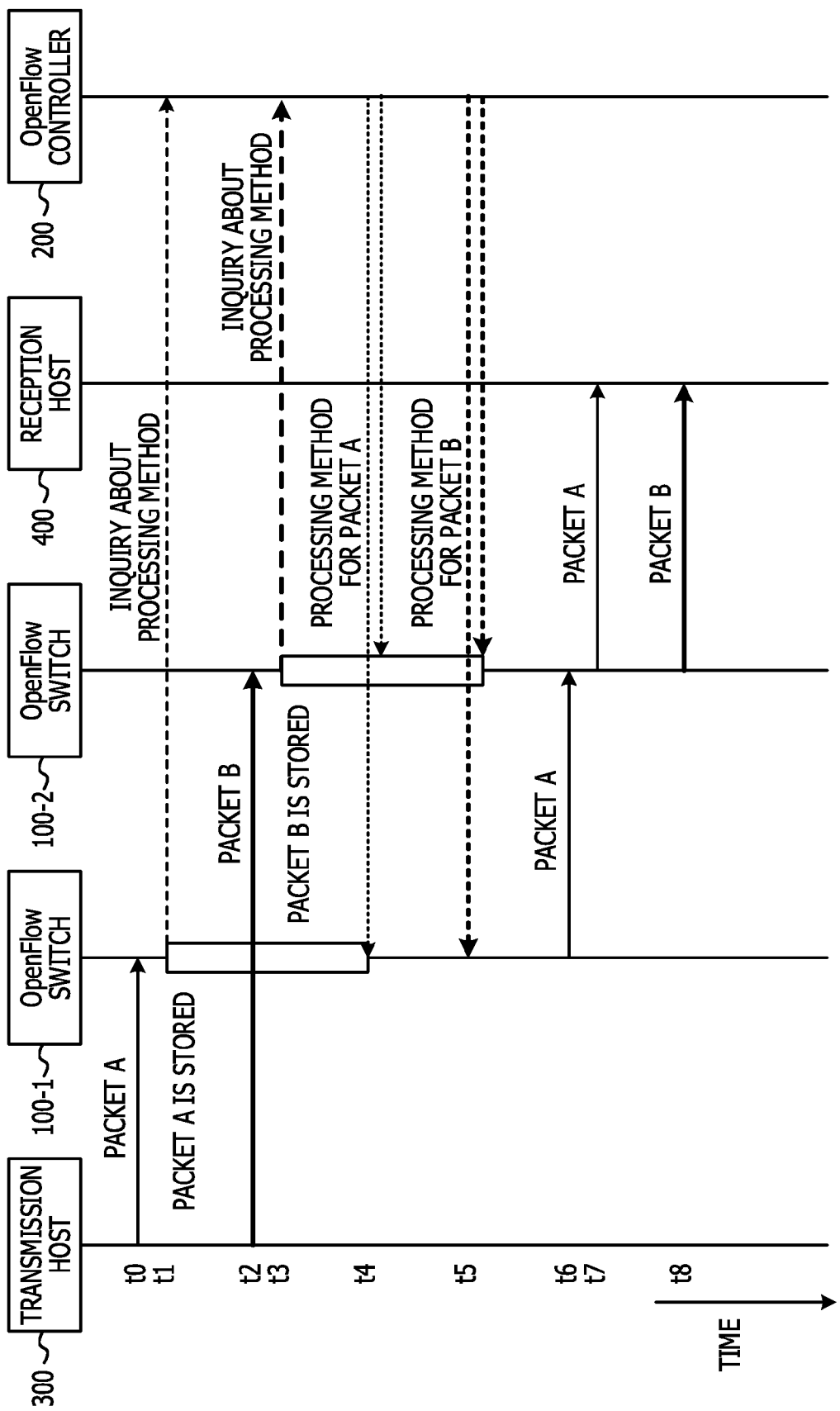
FIG. 14 is a sequence diagram depicting an example of the operation of the communication system in the first embodiment.

The above process will be further described chronologically with reference to FIG. 14.

FIG. 14 is a sequence diagram depicting an example of the operation of the communication system S1 in the first embodiment.

As depicted in FIG. 14, the transmission host 300 transmits packet A at time t0. Upon receiving packet A, the OpenFlow switch 100-1 stores packet A in the buffer at time t1 and inquires the processing method for packet A from the OpenFlow controller 200. While the OpenFlow switch 100-1 stores packet A, the transmission host 300 transmits packet B at time t2. If the OpenFlow switch 100-1 receives packet B and determines that the utilization rate is close to the value beyond which a buffer overflow occurs, the OpenFlow switch 100-1 forwards packet B to the OpenFlow switch 100-2. Upon receiving packet B, the OpenFlow switch 100-2 stores packet B in the buffer at time t3 and inquires the processing method for packet B from the OpenFlow controller 200.

The OpenFlow controller 200 transmits the processing method for packet A to the OpenFlow switches 100-1 and 100-2 at time t4. The OpenFlow controller 200 transmits the processing method for packet B to the OpenFlow switches 100-1 and 100-2 at time t5. Upon receiving the processing method for packet A, the OpenFlow switch 100-1 forwards packet A to the OpenFlow switch 100-2 at time t6. Upon receiving packet A, the OpenFlow switch 100-2 forwards packet A to the reception host 400 at time t7. Upon receiving the processing method for packet B, the OpenFlow switch 100-2 forwards packet B to the reception host 400 at time t8.

As described above, according to the first embodiment, a packet not defined in the flow table is input to the OpenFlow switch 100-1, an inquiry about the processing method for the packet is not carried out if the utilization rate of a buffer to be monitored is close to the value beyond which a buffer overflow occurs, and the input packet is forwarded to the next OpenFlow switch 100-2. Accordingly, the OpenFlow switch 100-1 is able to avoid a buffer overflow by the input packet, thereby resolving problems such as an increase in transmission time or reduction in transmission efficiency. In particular, it is not desired to substitute a buffer having a storage capacity larger than the buffer 110, thereby suppressing a rise in the cost of the OpenFlow switch. In addition, an inquiry about the processing method for the packet that makes the utilization rate of the buffer sufficiently lower than the value beyond which a buffer overflow occurs is carried out again. Accordingly, if a packet not defined in the flow table is input to the OpenFlow switch 100-1, an inquiry about the processing method for the packet is resumed.

Second Embodiment

Next, a second embodiment according to the present disclosure will be described with reference to FIGS. 15 to 18.

FIGS. 15 to 18 depict examples of the operation of a communication system S2 in the second embodiment.

Figure 15:
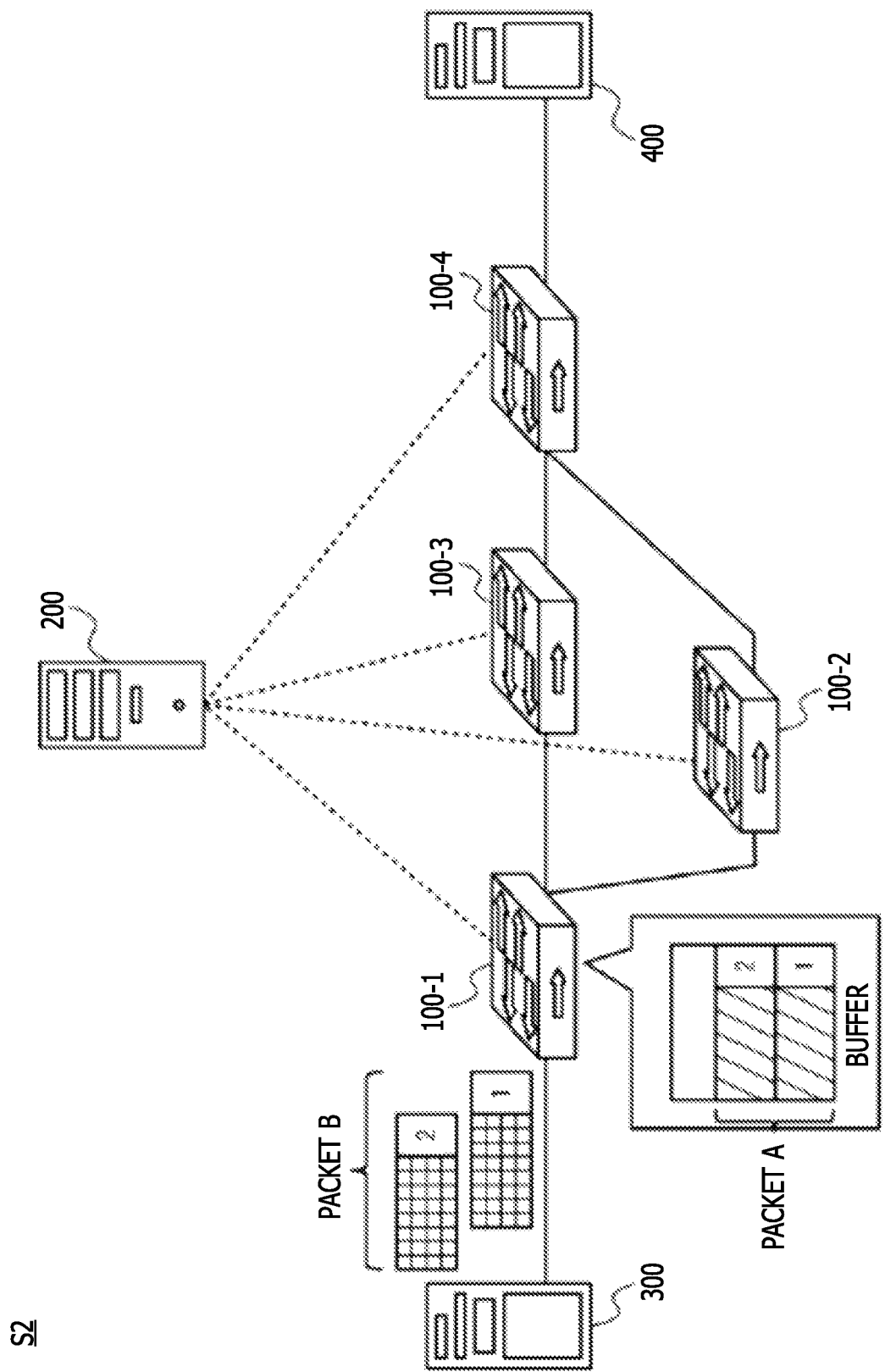
FIG. 15 depicts an example of the operation of a communication system in a second embodiment.

The communication system S2 includes the OpenFlow switches 100-1, 100-2, 100-3, and 100-4 and the OpenFlow controller 200 as depicted in FIG. 15, for example. The function and hardware structure of the OpenFlow switches 100-3 and 100-4 are similar to those of the OpenFlow switch 100-1.

The OpenFlow switch 100-1 is connected to the transmission host 300 through a communication line. The OpenFlow switch 100-4 is connected to the reception host 400 through a communication line. The OpenFlow switch 100-1 also is connected to the OpenFlow switches 100-2 and 100-3 through communication lines. The OpenFlow switch 100-4 is also connected to the OpenFlow switches 100-2 and 100-3 through communication lines. The OpenFlow switch 100-2 and the OpenFlow switch 100-3 are arranged in parallel. The OpenFlow switches 100-1 to 100-4 are connected to the OpenFlow controller 200 through control lines. The OpenFlow controller 200 controls the operation of the OpenFlow switches 100-1 to 100-4.

Figure 16:
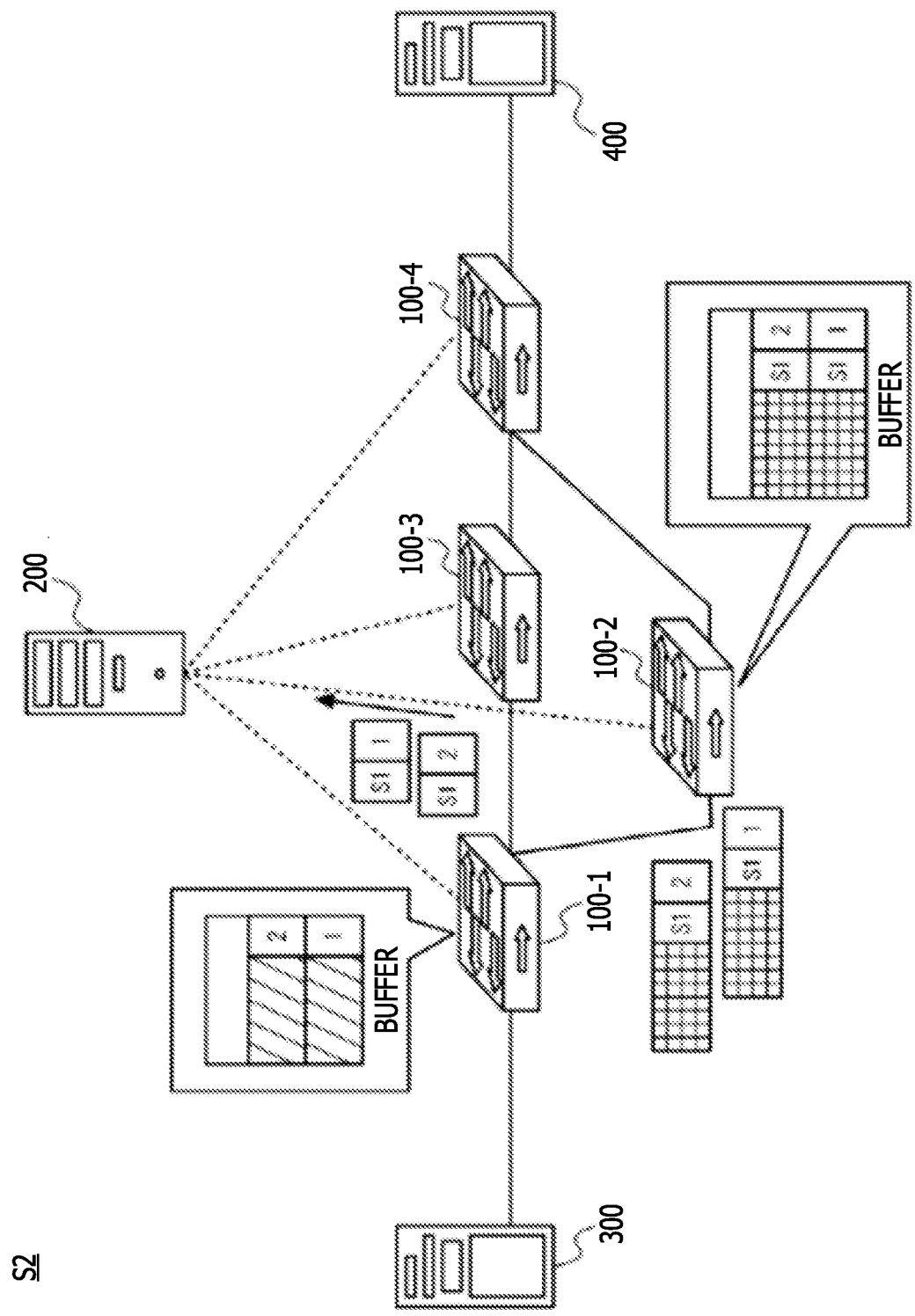
FIG. 16 depicts an example of the operation of the communication system in the second embodiment.

When packet A is input to the buffer of the OpenFlow switch 100-1 as depicted in FIG. 15 and the buffer utilization rate is close to the value beyond which a buffer overflow occurs, if packet B is input to the OpenFlow switch 100-1, an inquiry about the processing method for packet B is not carried out and packet B is forwarded to the OpenFlow switch 100-2 as depicted in FIG. 16. That is, packet B passes through the OpenFlow switch 100-1. The forwarding destination (the OpenFlow switch 100-2 or the OpenFlow switch 100-3) is set in advance in the OpenFlow switch 100-1. As depicted in FIG. 16, the packet transmission unit 130 of the OpenFlow switch 100-1 gives identification information to packet B when forwarding packet B. The identification information identifies the OpenFlow switch 100-1. In FIG. 16, identification information S1 is given to packet B.

If the buffer utilization rate is sufficiently lower than the value beyond which a buffer overflow occurs (for example, if no packet is stored in the buffer), the packet transmission unit 130 of the OpenFlow switch 100-2 stores the input packet B in the buffer. The packet transmission unit 130 of the OpenFlow switch 100-2 inquires the processing method for packet B. When inquiring the processing method, the packet transmission unit 130 transmits the identification information together.

Figure 17:
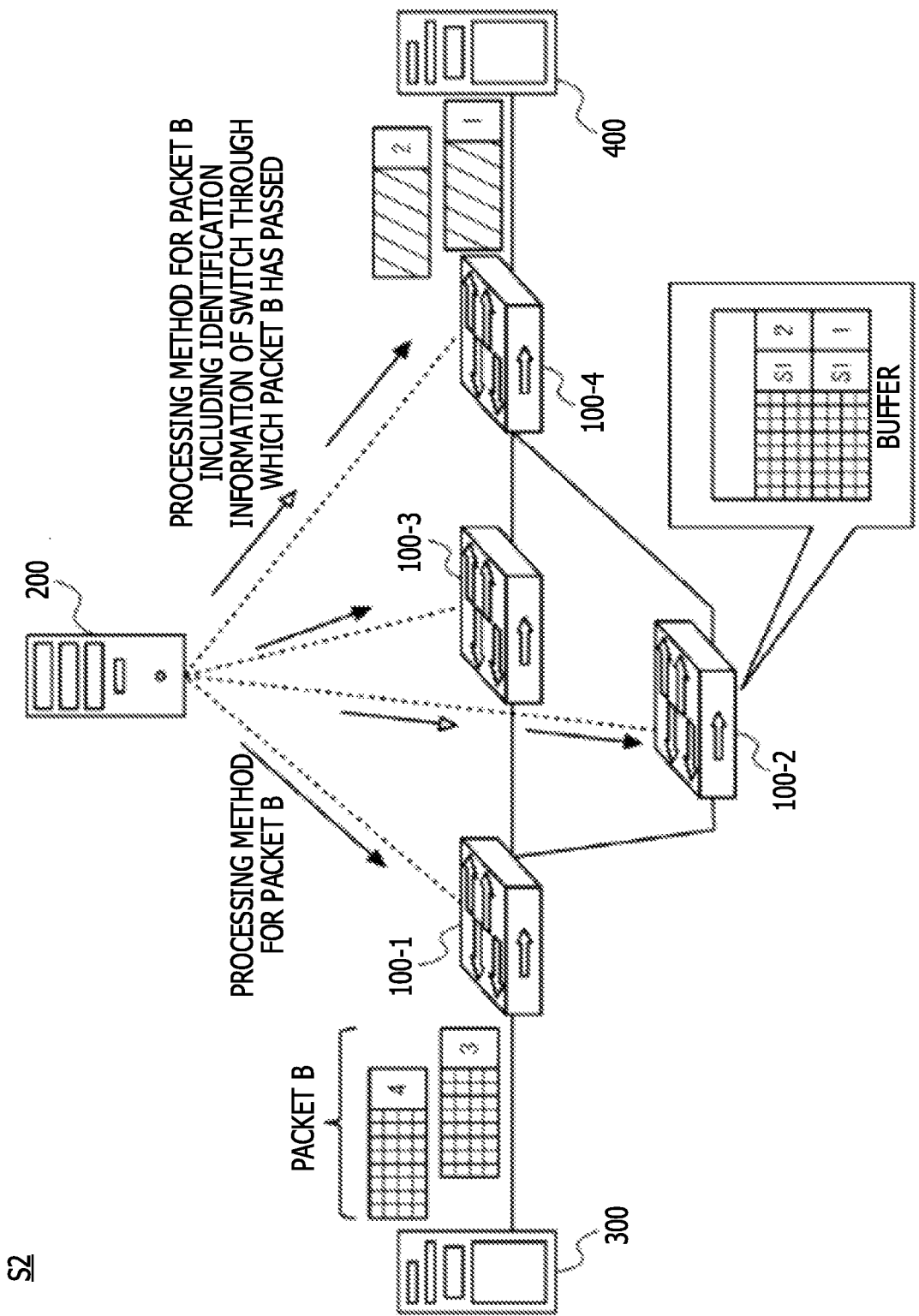
FIG. 17 depicts an example of the operation of the communication system in the second embodiment.
Figure 18:
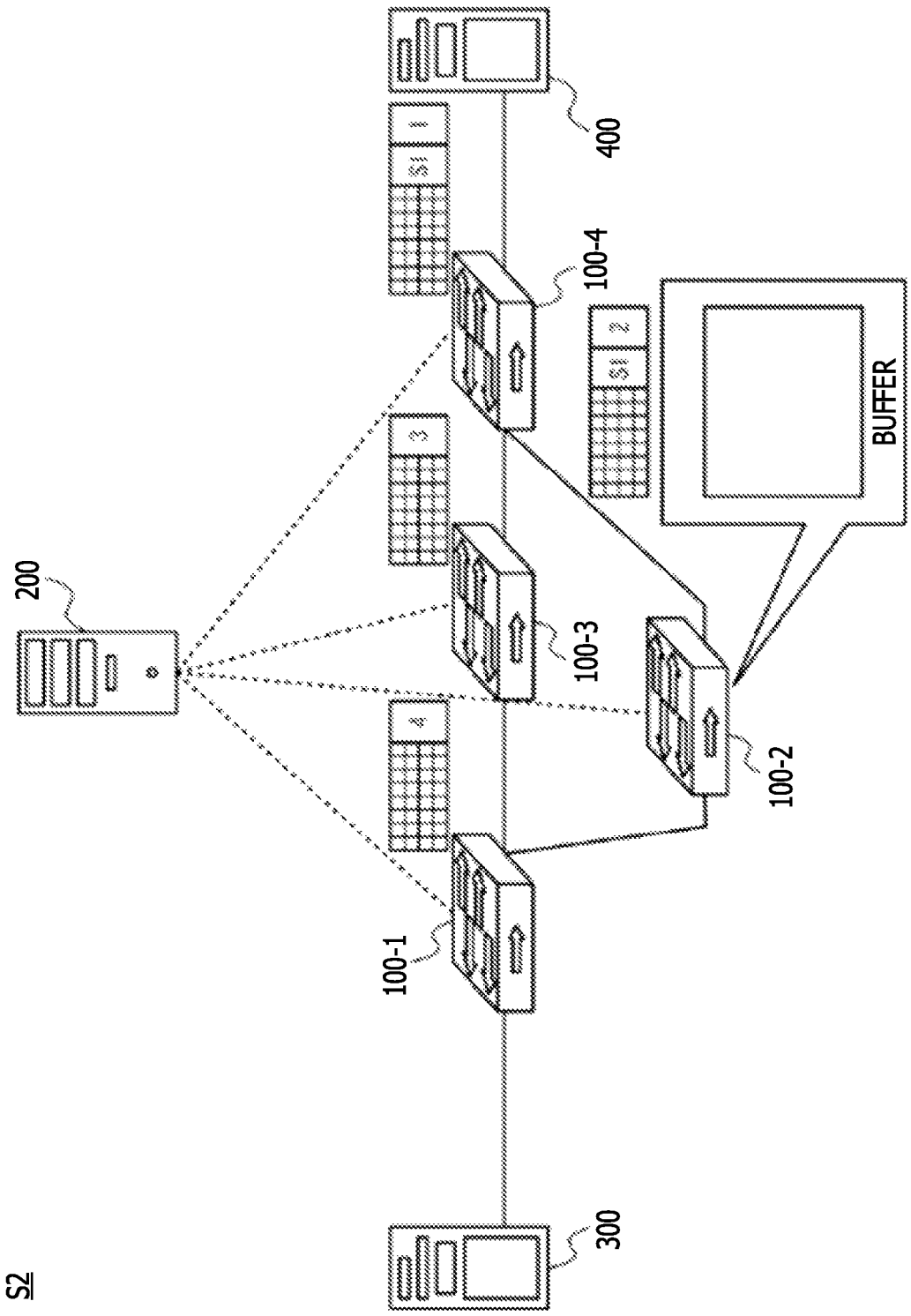
FIG. 18 depicts an example of the operation of the communication system in the second embodiment.

The OpenFlow switch identifying unit 210 of the OpenFlow controller 200 receives the inquiry about the processing method and the identification information. The OpenFlow switch identifying unit 210 recognizes identification information S1 of the OpenFlow switch through which packet B has passed, based on the received identification information. The route setting unit 220 of the OpenFlow controller 200 generates a processing method for packet B and, as depicted in FIG. 17, transmits the generated processing method to the OpenFlow switches 100-1 to 100-4. For example, the route setting unit 220 generates a processing method for forwarding packet B through the OpenFlow switches 100-1, 100-3, and 100-4 and transmits the processing method. As a result, if packet B including the sequence numbers 3 and 4 that follow the sequence number 2 is input to the OpenFlow switch 100-1 in FIG. 17, packet B including the sequence numbers 3 and 4 is forwarded through the OpenFlow switches 100-1, 100-3, and 100-4 that have received the processing method in sequence as depicted in FIG. 18. In FIG. 17, packet A is forwarded by the OpenFlow switches 100-1 and 100-2 or the OpenFlow switches 100-3 and 100-4 that have received the processing method and transmitted to the reception host 400.

On the other hand, the route setting unit 220 generates a processing method that is different from the above processing method. Specifically, the route setting unit 220 generates a processing method for packet B including identification information that has passed through. The route setting unit 220 transmits the generated different processing method to the OpenFlow switches 100-2 and 100-4 placed on the route through which packet B is delivered to the reception host 400, as depicted in FIG. 17. The OpenFlow switch 100-2 processes packet B including the sequence numbers 1 and 2 stored in the buffer using the different processing method. The OpenFlow switch 100-4 also processes it similarly. As a result, as depicted in FIG. 18, packet B including the sequence numbers 1 and 2 stored in the buffer of the OpenFlow switch 100-2 is forwarded to the reception host 400.

Upon receiving a packet including identification information, the reception host 400 notifies the OpenFlow switch 100-4 of the final stage of the fact. Upon receiving the notification, the packet transmission unit 130 of the OpenFlow switch 100-4 deletes the different processing method registered in the flow table. That is, the different processing method is temporarily stored in the OpenFlow switch 100-4 until the OpenFlow switch 100-4 receives the notification. Upon deleting the different processing method, the packet transmission unit 130 of the OpenFlow switch 100-4 notifies the OpenFlow switch 100-2 of the fact. Upon receiving the notification, the OpenFlow switch 100-2 deletes the different processing method as the OpenFlow switch 100-4.

As described above, according to the second embodiment, even if packet B is forwarded to a route different from the correct route and then stored in the buffer, a processing method different from the processing method for packet B is transmitted from the OpenFlow controller 200. The OpenFlow switches 100-2 and 100-4 placed on the route through which packet B is delivered receive the different processing method including identification information S1 and process packet B including identification information S1. As a result, packet B including identification information S1 is not discarded by the OpenFlow switch 100-2 and forwarded to the reception host 400, the transmission destination.

Preferred embodiments of the present disclosure have been described above. However, the present disclosure is not limited by specific embodiments and various modifications and changes are allowed within the scope of the present disclosure described in the claims. For example, two functions may be achieved by one device or one function may be distributed to two or more devices. Another object of the present disclosure is to obtain the effects that are achieved with the structures indicated in the above embodiments and are not achieved by conventional techniques. In addition, the utilization rate is used to describe the above embodiments, a utilization amount, consumption rate, consumption amount, remaining capacity, or remaining rate may be used for description instead.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet processing apparatus comprising:
   a memory configured to store flow information; and
   a processor coupled to the memory and configured to receive a packet,
   determine the received packet is to be transmitted to a node device,
   when a processing method for the received packet is not defined in the flow information and a utilization rate of a buffer in the packet processing apparatus exceeds a threshold value, determine whether the packet processing apparatus is a final stage processing apparatus connected to the node device,
   when it is determined that the packet processing apparatus is the final stage processing apparatus connected to the node device, discard the packet, and
   when it is determined the utilization rate of the buffer in the packet processing apparatus exceeds the threshold value and the packet processing apparatus is not the final stage processing apparatus, transmit the packet to another packet processing apparatus without storing the packet in the buffer and without issuing an inquiry about the processing method.

2. The packet processing apparatus according to claim 1, wherein
   the processor is further configured to
   when the processing method is not defined in the flow information and the utilization rate of the buffer does not exceed the threshold value, store the packet into the buffer and send the inquiry about the processing method to a controller.

3. The packet processing apparatus according to claim 2, wherein
   the controller transmits the processing method to the packet processing apparatus based on the inquiry.

4. The packet processing apparatus according to claim 2, wherein
   the packet processing apparatus and the another packet processing apparatus are OpenFlow switches and the controller is an OpenFlow controller.

5. The packet processing apparatus according to claim 1, wherein
   the processor is configured to monitor the utilization rate of the buffer.

6. The packet processing apparatus according to claim 1, wherein
   the flow information indicates a transmitting address of the packet.

7. A packet processing method comprising:
   receiving a packet by a first packet processing apparatus which stores flow information;
   determining the received packet is to be transmitted to a node device,
   when a processing method for the received packet is not defined in the flow information and a utilization rate of a buffer in the first packet processing apparatus exceeds a threshold value, determining whether the packet processing apparatus is a final stage processing apparatus connected to the node device,
   when it is determined that the packet processing apparatus is the final stage processing apparatus connected to the node device, discarding the packet, and
   when it is determined that the utilization rate of the buffer in the packet processing apparatus exceeds the threshold value and the first packet processing apparatus is not the final stage processing apparatus, transmitting the packet to a second packet processing apparatus without storing the packet in the buffer and without issuing an inquiry about the processing method.

8. The packet processing method according to claim 7, further comprising:

when the processing method is not defined in the flow information and the utilization rate of the buffer does not exceed the threshold value, storing the packet into the buffer and send the inquiry about the processing method to a controller.

9. The packet processing method according to claim 8, wherein
the controller transmits the processing method to the first packet processing apparatus based on the inquiry.

10. The packet processing method according to claim 8, wherein
the first packet processing apparatus and the second packet processing apparatus are OpenFlow switches and the controller is an OpenFlow controller.

11. The packet processing method according to claim 7, further comprising:
monitoring the utilization rate of the buffer.

12. The packet processing method according to claim 7, wherein
the flow information indicates a transmitting address of the packet.

13. A non-transitory computer-readable storage medium storing a program that causes a packet processing apparatus to execute a process, the process comprising:
receiving a packet by the packet processing apparatus which stores flow information,
determining the received packet is to be transmitted to a node device,
when a processing method for the received packet is not defined in the flow information and a utilization rate of a buffer in the packet processing apparatus exceeds a threshold value, determining whether the packet processing apparatus is a final stage processing apparatus connected to the node device,
when it is determined that the packet processing apparatus is the final stage processing apparatus connected to the node device, discarding the packet, and
when it is determined that the utilization rate of the buffer in the packet processing apparatus exceeds a threshold value and the packet processing apparatus is not the final stage processing apparatus, transmitting the packet to another packet processing apparatus without storing the packet in the buffer and without issuing an inquiry about the processing method.

14. The non-transitory computer-readable storage medium according to claim 13, wherein the process further comprises:
when the processing method is not defined in the flow information and the utilization rate of the buffer does not exceed the threshold value, storing the packet into the buffer and send the inquiry about the processing method to a controller.

15. The non-transitory computer-readable storage medium according to claim 14, wherein
the controller transmits the processing method to the packet processing apparatus based on the inquiry.

16. The non-transitory computer-readable storage medium according to claim 13, wherein the process further comprises:
monitoring the utilization rate of the buffer.

17. The non-transitory computer-readable storage medium according to claim 13, wherein
the packet processing apparatus and the another packet processing apparatus are OpenFlow switches and the controller is an OpenFlow controller.

\* \* \* \* \*